July 29, 1924.
W. B. OSBORNE
STORAGE BATTERY
Original Filed Nov. 22, 1920   2 Sheets-Sheet 2
1,503,060
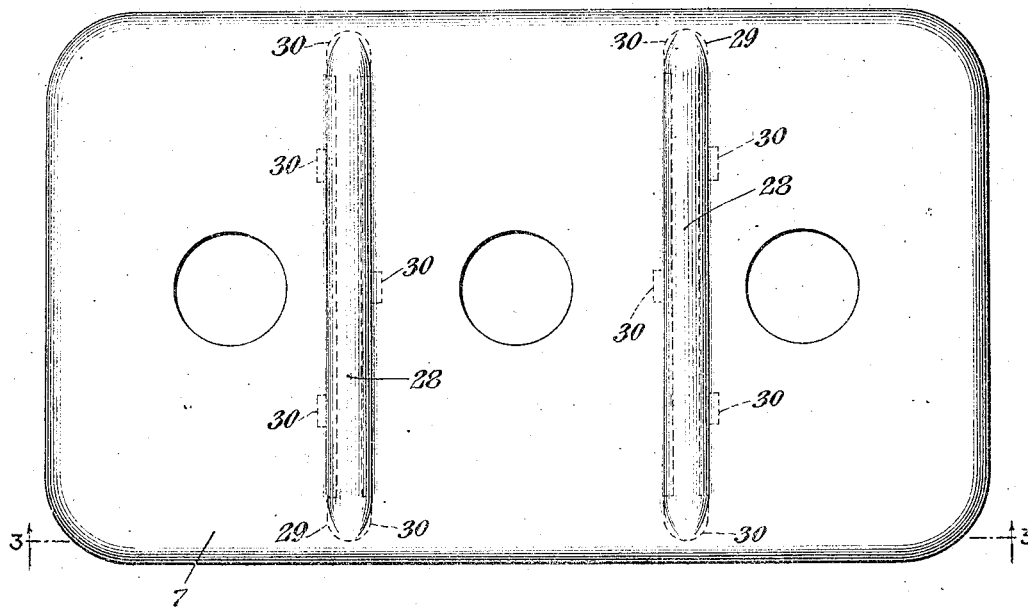
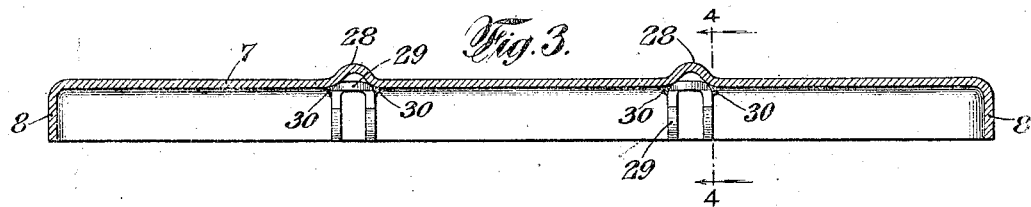
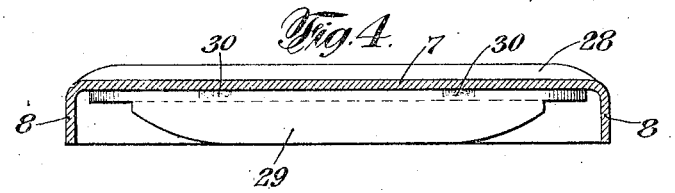
INVENTOR
Willard B Osborne
BY
Gorham Crosby
ATTORNEY Patented July 29 1924

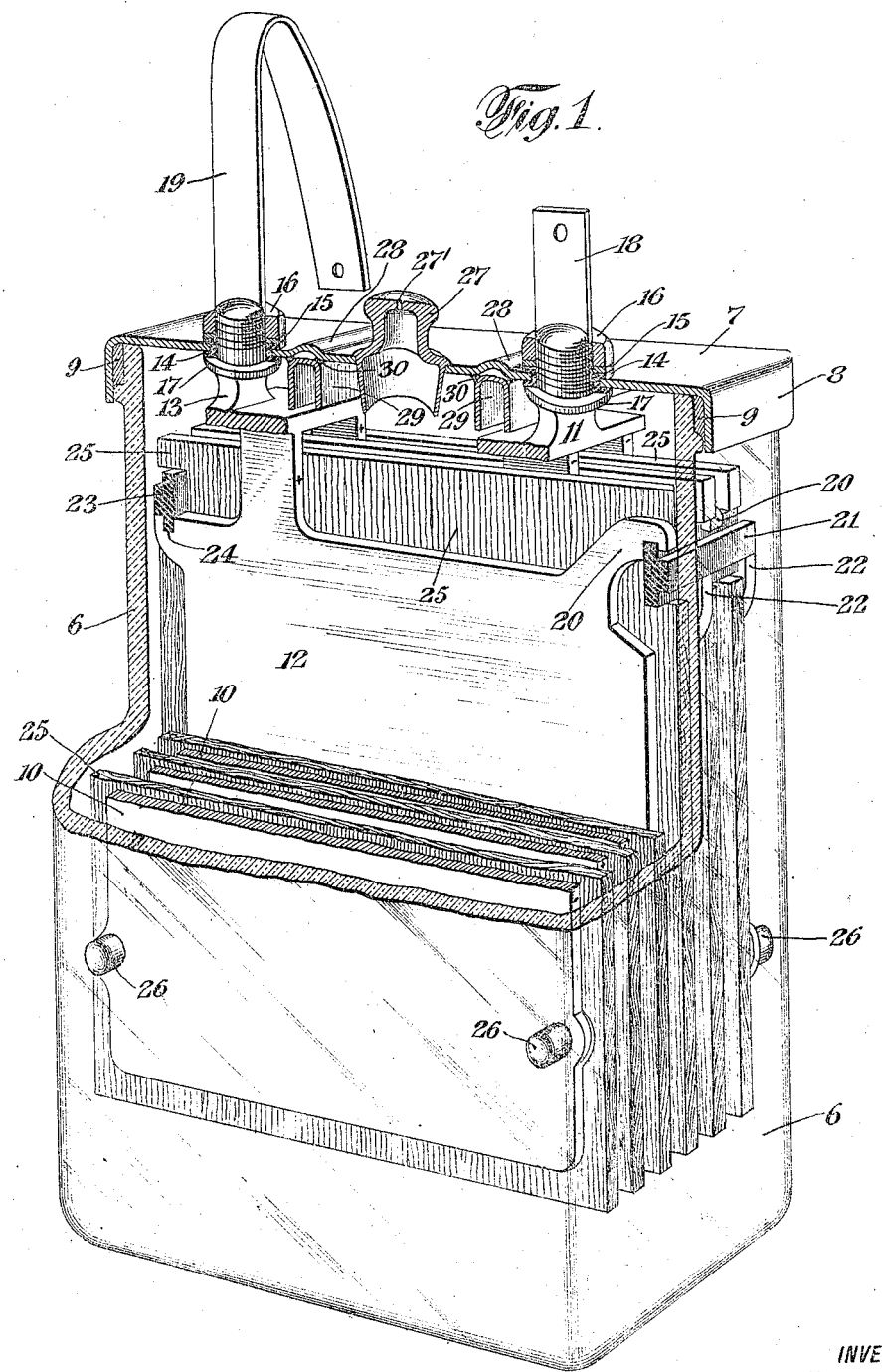

1,503,060

UNITED STATES PATENT OFFICE.

WILLARD B. OSBORNE, OF ELMA, NEW YORK, ASSIGNOR TO GOULD STORAGE BATTERY COMPANY, A CORPORATION OF NEW YORK.

STORAGE BATTERY.

Application filed November 22, 1920, Serial No. 425,603. Renewed February 19, 1924.

*To all whom it may concern:*

Be it known that I, WILLARD B. OSBORNE, citizen of the United States, and resident of Elma, in the county of Erie and State of New York, have invented certain new and useful Improvements in Storage Batteries, of which the following is a specification.

My invention relates to improvements in storage batteries and more particularly to storage batteries wherein sets of positive and negative plates are normally supported by the cover of the container in which they are placed. The main object of the invention is to provide an arrangement in which sets of positive and negative plates may not only be so supported from a cover of acid-resisting material not easily breakable, but also in which the cover is suitably reinforced to reduce the sagging of the cover due to the weight of the plates supported thereby. Further and more specific objects, features and advantages will more clearly appear from the detail description given below taken in connection with the accompanying drawings which form a part of this specification.

In the drawings, Fig. 1 is a perspective, partly in section, of a storage battery cell embodying my improvements in a preferred form thereof. Fig. 2 is a plan view of the cover of the battery shown in Fig. 1. Fig. 3 is a section taken on the line 3—3 of Fig. 2. Fig. 4 is a section taken on the line 4—4 of Fig. 3, and Fig. 5 is a bottom view of one of the reinforcing members shown in Figs. 1, 3 and 4.

Referring to the drawings, 6 represents a suitable container preferably a glass jar provided with a cover 7 made of an alloy of antimony and lead. By making the cover of an antimony lead alloy of suitable proportions, the cover is not only acid resisting but is strengthened to a considerable extent. Cover 7 is provided with a depending flange 8 at its edges and the battery may be suitably sealed by a sealing compound 9 placed between the depending flange 8 and the top of the glass jar 6. The battery shown is provided with a set of negative plates 10 connected to a common terminal lug 11 and a set of positive battery plates 12 connected to a common terminal post 13. The terminal posts are preferably made of lead or an alloy of antimony and lead and are provided with screw threaded extensions passing up through circular openings in the cover 11. Where the lugs pass through the cover 7, they are surrounded with soft rubber bushings 14 on top of which are placed hard rubber washers 15. Hard rubber nuts 16 are screw threaded on to the top of the terminal lugs 11 and 13 in order to pull the flanges 17 on the lugs firmly up against the underneath side of the bushings 14 whereby the two sets of plates are firmly secured to and supported by the cover 7. The lugs 11 and 13 are preferably provided with integral electrical connecting straps 18 and 19 respectively.

The positive plates 12 are connected to the terminal post 13 at one end of the plates and at the other end of the plates they are provided with notched projections 20, the notches being adapted to extend over both sides of a strip of insulating material such as hard rubber 21, the lower edge of which rests upon the terminal ends of the negative plates at 22 by engaging notches in the top edges thereof. The free ends of the negative plates are provided with similar notched projections engaging over the upper edge of an insulating hard rubber strip 23, the bottom edge of which rests upon and is supported by the upper edge of the positive plates at the terminal end thereof by engaging notches 24 therein. Wood separators 25 are provided between alternate plates and these separators are provided with notches in their side edges through which the insulating members 21, 23 pass so that the wood separators are also supported and properly held in place by the insulating supporting members 21 and 23. In this way both sets of plates are supported from the cover 7 through the terminal lugs 11 and 13 and are held in proper relative position by the interlocking insulating bars 21 and 23. The outside negative plates are preferably provided with soft rubber buttons 26 adapted to space the plates from the sides of the jar 6 and prevent the plates from rattling or shifting during transportation or handling of the battery, which would tend to breakage of the parts. The cover 7 is also provided with a central filling opening into which is inserted a hollow soft rubber hollow vent plug 27 provided with a central vent opening 27'. The vent opening 27' provides for escape of gases and when it is desired to refill the battery, the plug 27 is easily removed to provide an ample sized opening for refilling.

Even although the lead cover 7 contains a substantial amount of antimony to make it more rigid, it is found that the weight of the plates is so great that in a short time the cover is likely to sag very much. In order to reduce this sagging the cover 7 is provided with upwardly stamped ribs 28, one on each side of the central vent plug 27 and between it and the terminals 11 and 13 and depending from the bottom side of the cover directly underneath the ribs 28, I provide further reinforcing means, said reinforcing means comprising two members 29 U shaped in cross section and made of acid resisting material such as antimony lead alloy and secured to the underneath side of the cover 7 preferably by being burned thereto as at 30, 30. As shown in Figs. 2, 3, and 4 the depending rib members 29 extend substantially across the cover 7 between the terminals and one on either side of the central opening in the cover. The members 29 are provided with an upper flat portion and two depending rib portions so that they become U shaped in cross sections. In this way the antimony-lead cover is greatly strengthened and reinforced without adding any substantial weight thereto. The upwardly extending ribs 28 on each side of the vent also prevent acid which may be condensed on the top of the cover from extending from one terminal to the other.

While I have described my improvements in great detail and with respect to a preferred form thereof, I do not desire to be limited to such details or form since many changes and modifications may be made and the invention embodied in widely different forms without departing from the spirit and scope thereof in its broader aspects.

What I claim as new and desire to secure by Letters Patent is:

1. A storage battery having in combination a suitable container, an antimony lead cover therefor, a set of positive plates and a set of negative plates supported in the container from said cover, said cover having reinforcing means depending from the bottom side thereof to reduce the sagging of the cover due to the weight of the plates supported thereby.

2. A storage battery having in combination a suitable container, an antimony lead cover therefor, a set of positive plates and a set of negative plates supported in the container from said cover, said cover having reinforcing means depending from the bottom side thereof to reduce the sagging of the cover due to the weight of the plates supported thereby, said reinforcing means comprising a plurality of acid resisting members, U shaped in cross-section, secured to and extending across the underneath side of the cover.

3. A storage battery having in combination a suitable container, an antimony lead cover therefor, a set of positive plates, a set of negative plates, terminals for each set, means whereby each set of plates is supported in the container from said cover by means of said terminals, said cover having reinforcing ribs depending from the bottom side thereof to reduce the sagging of the cover due to the weight of the plates supported thereby.

Signed at Depew, in the county of Erie and State of New York, this nineteenth day of November A. D. 1920.

WILLARD B. OSBORNE.